PHOTOSENSITIVE SCANNER WITH AUTOMATIC RANGE CONTROL

Filed Jan. 8, 1963

INVENTOR.
HUGH C. RESSLER
BY Edward J. Connors
Attorney

United States Patent Office
3,192,390
Patented June 29, 1965

3,192,390

PHOTOSENSITIVE SCANNER WITH AUTOMATIC RANGE CONTROL

Hugh C. Ressler, Flushing, N.Y., assignor to Hogan Faximile Corporation, New York, N.Y.

Filed Jan. 8, 1963, Ser. No. 250,056
4 Claims. (Cl. 250—227)

The present invention relates to scanners such as used in facsimile transmitters and in densitometers, and more particularly to an improved scanner incorporating automatic control of its photoelectric device output.

In a facsimile transmitter subject copy is scanned by a so-called "scanner" or image dissector in which light is passed through, or reflected from, the copy as it is moved along a scanning line. The light from elemental areas of the copy is sequentially passed to photoelectric means thereby providing an analogue type electrical signal which is used to control a facsimile recorder to reproduce a facsimile copy.

The scanner or image dissector is used in densitometers to evaluate the light transmitting or reflecting characteristics of subject copy or of copies thereof. In the densitometer, the copy is usually not moved and the scanner is arranged to repetitively scan a characteristic area of the subject copy a single elemental area in width or a single "sweep" at a time. The sweep may be linear or in any desired pattern. A suitable densitometer using one form of image dissector providing a linear sweep is shown in a co-pending application of John W. Smith, Hugh C. Ressler, and David Shaler, Serial No. 250,079 filed on even date herewith, and titled "Densitometer." When used in a densitometer the output of the scanner may be applied to a display device such as an oscilloscope for visual interpretation of the dissected area, or the output may be connected to any desired indicator means such as a recorder, lamp, meter, counter or logic device.

During operation of the scanner, there may be variations in the voltage of the source, in the sensitivity of the photoelectric means, and the bulbs of the light source may become darkened with age. Unless these variables are automatically compensated, laborious and slow mechanical calibration procedures must be employed to maintain the original calibration of the scanner.

In using a scanner in a densitometer it is desirable to provide both black and white reference levels in order to evaluate the background and lines of the scanned material. An absolute black level may be obtained by completely masking the photoelectric means from the light source for a short period of time during the repetitive scanning cycle. Absolute white, or minimum density level, has been heretofore difficult to obtain since the film may not contain clear areas necessary to establish the zero density reference unless specially treated in advance or punched to assure the desired zero density.

The present invention aims to provide an improved scanner in which means are provided to overcome the difficulties arising from voltage variations of the source, and from aging of the light source and photoelectric device.

In accordance with the invention this is accomplished broadly by providing means for transmitting a sample of light directly from the source to the photoelectric device which produces an output pulse responsive thereto. More specifically, the output pulse is compared with a standard reference and any difference therefrom is used to control compensating means so that the output of the photoelectric device is unaffected by voltage variations, by aging of the light source, or by its own aging.

Other objects and advantages of the invention will be apparent from the following description and from the accompanying drawing which shows, by way of example, an embodiment of the invention.

Figures 1, 2:
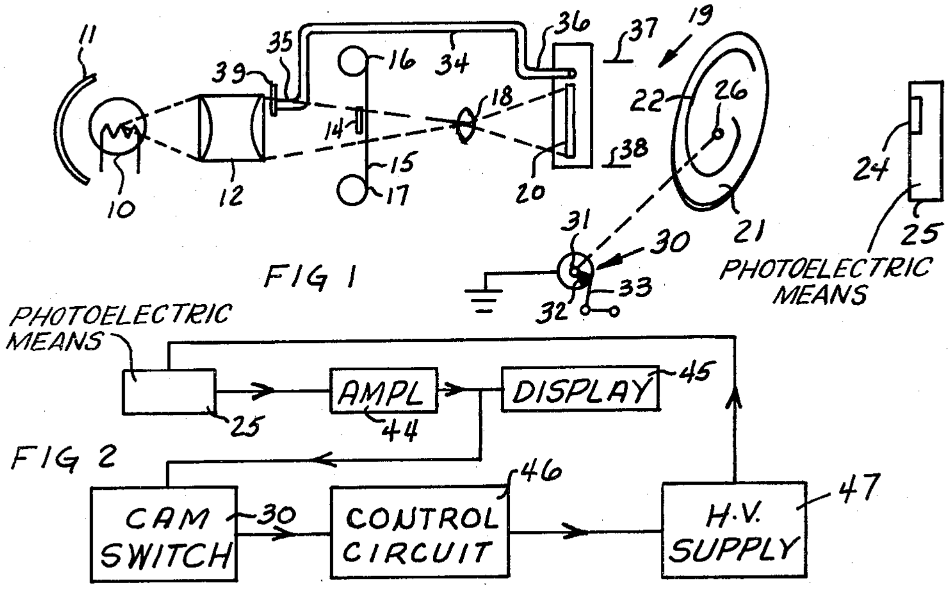
FIGURE 1 is a schematic illustration of an improved scanner in accordance with the invention.
FIGURE 2 is a block diagram of the electric circuit of the improved scanner.

Referring to the drawings there is shown in FIGURE 1 a schematic illustration of a scanner in accordance with the invention. Light from a source 10 and from a reflector 11 is directed through condenser lens 12 to a field of scan 14 across which is passed a film 15 from a roller 16 to a take up roller 17. The light transmitted by the film 15 is collected by a lens 18 and focussed on an image dissector 19 which may be of the type shown in my co-pending application titled "Photosensitive Fiber Optic Scanner," Serial No. 250,057 and filed on even date herewith.

Alternatively, the image dissector 19 may be of the type including a linear light transmitting slit 20 past which is rotated a disc 21 carrying a light transmitting spiral 22. Light passed by the image dissector 19 from elemental areas of the image focussed on the linear slit 20 is directed at photosensitive surface 24 of photoelectric means 25 which may be a photomultiplier tube. The field of scan, as is well known in the art, may be either a transparency through which the light is transmitted or an opaque surface from which the light is reflected. For simplicity of illustration only the transmission type of field of scan is shown, although it is to be understood that the invention disclosed herein is equally applicable to the transmission or reflectance type scanner.

On shaft 26 for the disc 21 is switch means 30 operable during a predetermined angle of rotation of the disc. The switch means 30 is illustrated as a rotatable commutator 31 having a grounded segment 32 contacting a brush 33. It will be noted that the contact between the segment 32 and the brush 33 may be predetermined making the peripheral extent of the segment 32 of the desired length. Such a commutator switch is shown in U.S. Patent No. 2,630,494, issued to John W. Smith on March 3, 1953. Alternatively, any suitable construction well known in the art may be used for actuating a circuit into open and closed condition for operation by the rotation of the shaft such as the cam operated switch shown in U.S. Patent No. 2,257,918, issued to me on October 7, 1941.

In accordance with the invention sampling light transmitting means is arranged to convey a sample of light from the source just ahead of the field of view 14 to the field of view of the scanner of the image dissector. Any suitable means may be used for conveying the sample of light such as by so constructing and arranging the parts that a sample of light is passed directly along the desired path. Alternatively a series of mirrors may be used or a light pipe having its inner surface made in appropriate light reflecting condition. Preferably, for ease of construction, an optical fiber 34 may be used having a diameter of the order of from about two to ten mils.

One end 35 of the optical fiber is positioned intermediate the condenser lens and the field of view 14 facing the light source 10. The other end 36 of the optical fiber 34 may be positioned at one end of the linear light transmitting slit 20 and spaced therefrom by a short distance. The optical fiber is suitably encompassed by tubing or the like so as to be shielded from extraneous light. The parts are so constructed and arranged that the light transmitting spiral 22 intercept a field of view indicated by the points 37 and 38. If desired a variable density filter 39 may be interposed in the light path of the campling light and is most conveniently positioned as illustrated between end 35 of the fiber 34 and the condenser lens 12.

The electric circuit of the scanner is shown in block diagram in FIGURE 2 and may include the photo-multiplier tube 25, and an amplifier 44 for the output thereof connected to indicating means 45. The output of the amplifier 44 is also passed through the commutator switch 30 to a control circuit 46 for a high voltage supply 47.

The indicating means 45 may be a display device such as an oscilloscope or as previously stated may be a recorder, a lamp, a meter, a counter or any suitable form of logic device in connection with which suitable amplification means may be provided as desired. The high voltage supply 47 may be of any suitable construction well known in the art for the supply of photo-electric devices. The control circuit 46 is shown schematically in FIGURE 4 and may include a Zener diode 50 used as a voltage reference, a load resistor 51 for the Zener diode, a charging diode 52, a capacitor 54, a bleed resistor 55 for the capacitor 54, and a control device 56 for the high voltage supply 47, the high voltage supply 47 having a positive terminal 61 and a negative terminal 62. As shown the control device 56 is a triode having an anode 64, a grounded cathode 65 and a grid 66.

Figure 4:
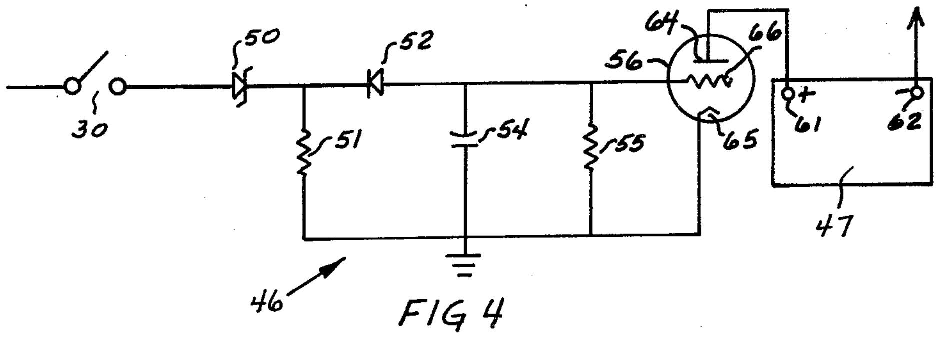
FIGURE 4 is a schematic wiring diagram of the control circuit of FIGURE 2.

In FIGURE 4 the high voltage supply 47 is shown as a block diagram connected to the anode or plate 64. Any known circuit may be used for the high voltage supply 47, for example, the power supply 47 may be of the type shown in Tektronix Instruction Manual, Type 360, published in December 1958, drawing labeled "CRT." In this circuit a halfwave rectifier for the high voltage supply is supplied from a transformer powered by an oscillating circuit, which in turn is controlled by the plate circuit of a triode V100A. This triode serves the same function as the control tube 56. Control is achieved when a high negative pulse is supplied through the commutator switch 30 which passes the Zener 50 and the diode 52 to establish a negative level on the capacitor 54. This negative level lowers the potential of grid 66 so that less current is passed which causes the power supply 47 to be lowered in output.

Figure 3:
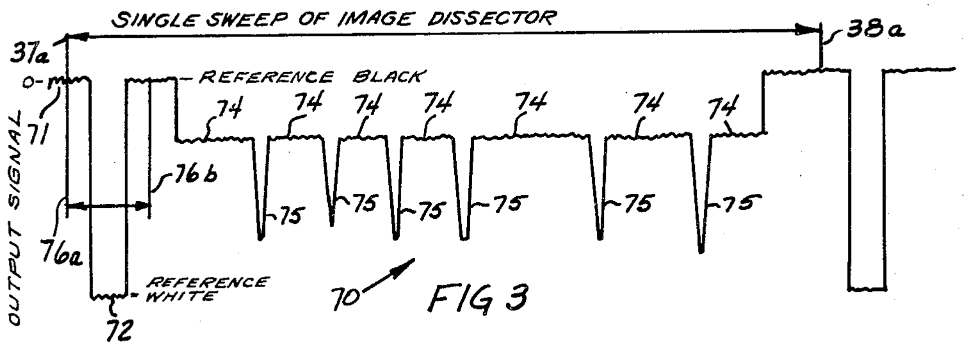
FIGURE 3 is a waveform illustrating a typical output of the scanner.

A waveform 70 of the output of the photoelectric device 25 is shown in FIGURE 3. A single sweep of the image dissector is indicated between the points *37a* and *38a*. The waveform includes a reference black portion 71 located at the zero axis. A reference white portion 72 results when the scanner views sampling light through the optical fiber 34. The waveform portion generally indicated at 74 represents the background density. The spikes 75 represent lines on the copy. The irregularity of the portions 71, 72 and 74 is due to noise. The length of the segment 32 of the switch means 30 is made such that the switch 30 is conductive during the portion of the waveform between the lines *76a* and *76b*.

It is desirable that the length of the commutator segment 32 of the switch means 30 to be such as to transmit a portion of the true black 71 on both sides of the true white wavefrom 72 so as to provide a sharp pulse into the control circuit 46 and to display these levels on the display device.

The pulse forming the portion of the waveform 70 between the points *76a* and *76b* is transmitted to a Zener diode 50. In the event the magnitude of the pulse is above the threshold of the Zener diode it is passed through the load resistor 51 to ground. The voltage appearing across the load resistor 51 passes current through the charging diode 52 and charges the capacitor 54 to a desired level. During the period when the switch means 30 is opened the capacitor 54 discharges slowly through the bleed resistor 55 to ground, meanwhile maintaining a negative potential of the desired amount on the grid 66 of the control means 56 so as to maintain the high voltage supply at the photoelectric device 25 of a desired level.

Upon the starting up of the system the circuit is such that the high voltage supply tends to build up a higher than required voltage. This causes the Zener 50 to pass pulses to charge the capacitor 54 and thus a potential is applied to the grid 66 of control means 56 which reduces the voltage of the high voltage supply to its nominal level. The Zener 50 then passes pulses of standard amplitude to the capacitor 54 maintaining a steady potential across it. Should the reference light intensity increase due to changes in supply voltage, the voltage across capacitor 54 increases producing a compensating decrease in the high voltage supply 47. Should the reference light intensity diminish due to lamp ageing or supply voltage changes, the voltage across capacitor 54 decreases thereby producing a compensating increase in the high voltage supply 47. This sequence of operations is repeated at a fast rate resulting in an extremely satisfactory control of the high voltage supply.

It is obvious that during voltage variations of the source or as the bulb of the light source becomes darkened due to age and in the event the photoelectric device loses its sensitivity a compensation is made in that the high voltage supply is increased so as to produce a constant output thereof. The charge on the capacitor 54 remains substantially constant during a sweep of the scanner so that the video portion of the output waveform 70 is maintained constant irrespective of the voltage or other variations.

While the invention has been described and illustrated with reference to a specific embodiment thereof, it will be apparent that other embodiments may be resorted to without departing from the invention. Therefore the form of the invention set out above should be considered as illustrative and not as limiting the scope of the following claims.

I claim:

1. A scanner comprising a light source to illuminate a field to be scanned, an image dissector of the type including a rotatable member, the image dissector positioned to receive light from the scanned field, a photoelectric device positioned to be responsive to light passed by the image dissector, a power supply for the photoelectric device, sampling light means having one end facing the light source and located between the light source and the field of scan, the other end of the sampling light means facing the image dissector within the scanned field, Zener diode, switch means operative with the rotatable member for connecting the Zener diode to the photoelectric device while it is viewing the sampling light means, a load resistor for the Zener diode, a blocking diode connected in series with the Zener diode, a capacitor charged through the blocking diode, a bleed resistance for the capacitor, and voltage regulating means for the power supply being responsive to the potential of the capacitor, whereby the output of the photoelectric device is regulated by the Zener diode.

2. A scanner comprising a light source to illuminate a field to be scanned, an image dissector of the type including a rotatable member, the image dissector positioned to receive light from the scanned field, a photoelectric device positioned to be responsive to light passed by the image dissector, a power supply for the photoelectric device, an optical fiber having one end facing the light source and located between the light source and the field of scan, the other end of the optical fiber facing the image dissector within the scanned field, threshold voltage means, switch means operative with the rotatable member for connecting the threshold voltage means to the photoelectric device while it is viewing the optical fiber, a capacitor charged through the threshold voltage means, a bleed resistance for the capacitor, and voltage regulating means for the power supply being responsive to the potential of the capacitor, whereby the output of the photoelectric device is regulated by the threshold voltage means.

3. A scanner comprising a light source to illuminate a field to be scanned, an image dissector of the type including a rotatable member, the image dissector positioned to receive light from the scanned field, a photoelectric device positioned to be responsive to light passed by the image dissector, a power supply for the photoelectric device, sampling light means having one end facing the light source and located between the light source and the field of scan, the other end of the sampling light means facing the image dissector within the scanned field, threshold voltage means, switching means operative with the rotatable member for connecting the threshold voltage means to the photoelectric device while it is viewing the sampling light means, a capacitor charged through the threshold voltage means, a bleed resistance for the capacitor, and voltage regulating means for the power supply being responsive to the potential of the capacitor, whereby the output of the photoelectric device is regulated by the threshold voltage means.

4. A scanner comprising a light source to illuminate a field to be scanned, an image dissector of the type including a rotatable member, the image dissector positioned to receive light from the scanned field, a photoelectric device positioned to be responsive to light passed by the image dissector, a power supply for the photoelectric device, an optical fiber having one end facing the light source and located between the light source and the field of scan, the other end of the optical fiber facing the image dissector within the scanned field, a Zener diode, switch means operative with the rotatable member for connecting the Zener diode to the photoelectric device while it is viewing the optical fiber, a load resistor for the Zener diode, a blocking diode connected in series with the Zener diode, a capacitor charged through the blocking diode, a bleed resistance for the capacitor, and voltage regulating means for the power supply being responsive to the potential of the capacitor, whereby the output of the photoelecric device is regulated by the Zener diode.

References Cited by the Examiner

UNITED STATES PATENTS

| | | | |
|---|---|---|---|
| 2,583,132 | 1/52 | Altar et al. | |
| 2,686,266 | 8/54 | Pringle et al. | 250—207 X |
| 2,840,720 | 6/58 | Van Rennes | 250—207 |
| 2,841,718 | 7/58 | Hoover | 250—207 |
| 3,127,464 | 3/63 | Gustavson | 88—1 |

RALPH G. NILSON, *Primary Examiner.*

WALTER STOLWEIN, *Examiner.*